United States Patent [19]

van den Berg

[11] 4,074,084

[45] Feb. 14, 1978

[54] METHOD AND APPARATUS FOR RECEIVING SOUND INTENDED FOR STEREOPHONIC REPRODUCTION

[76] Inventor: Johannes Cornelis Maria van den Berg, Kleibroek 14, Castricum, Netherlands

[21] Appl. No.: 629,049

[22] Filed: Nov. 5, 1975

[51] Int. Cl.[2] ........................ G11B 23/18; H04R 5/00

[52] U.S. Cl. ........................ 179/100.1 TD; 179/1 G

[58] Field of Search ........ 179/100.1 TD, 1 G, 15 BT, 179/100.1 R

[56] References Cited

U.S. PATENT DOCUMENTS

| | | | |
|---|---|---|---|
| 2,249,606 | 7/1941 | Friebus | 179/100.1 TD |
| 2,515,619 | 7/1950 | Weyers | 179/100.1 TD |
| 2,819,348 | 1/1958 | Bogert | 179/100.1 TD |
| 3,110,769 | 11/1963 | Bertram | 179/100.1 TD |
| 3,818,136 | 6/1974 | Schott | 179/100.1 TD |
| 3,824,342 | 7/1974 | Christensen | 179/100.1 TD |

*Primary Examiner*—Bernard Konick

*Assistant Examiner*—Alan Faber

*Attorney, Agent, or Firm*—Baldwin, Egan, Walling & Fetzer

[57] ABSTRACT

A method for receiving sound intended for stereophonic reproduction and an apparatus for applying this method. The sound is received by means of two or more microphone pairs of the dummy head type. The microphone pairs are coupled so that signals collected by microphones located on similar sides of the dummy heads are essentially additively combined. The resultant signals can be further processed in a known per se manner and can be used for recording or immediate retransmission. The number of microphone pairs is at least two and depends on the reception conditions. The distance between the microphone pairs is likewise dictated by the reception conditions. The apparatus comprises at least two microphone pairs of the dummy head type and means for essentially additively combining the signals from microphones located on similar sides of the dummy heads.

5 Claims, 2 Drawing Figures

METHOD AND APPARATUS FOR RECEIVING SOUND INTENDED FOR STEREOPHONIC REPRODUCTION

Figure 1:
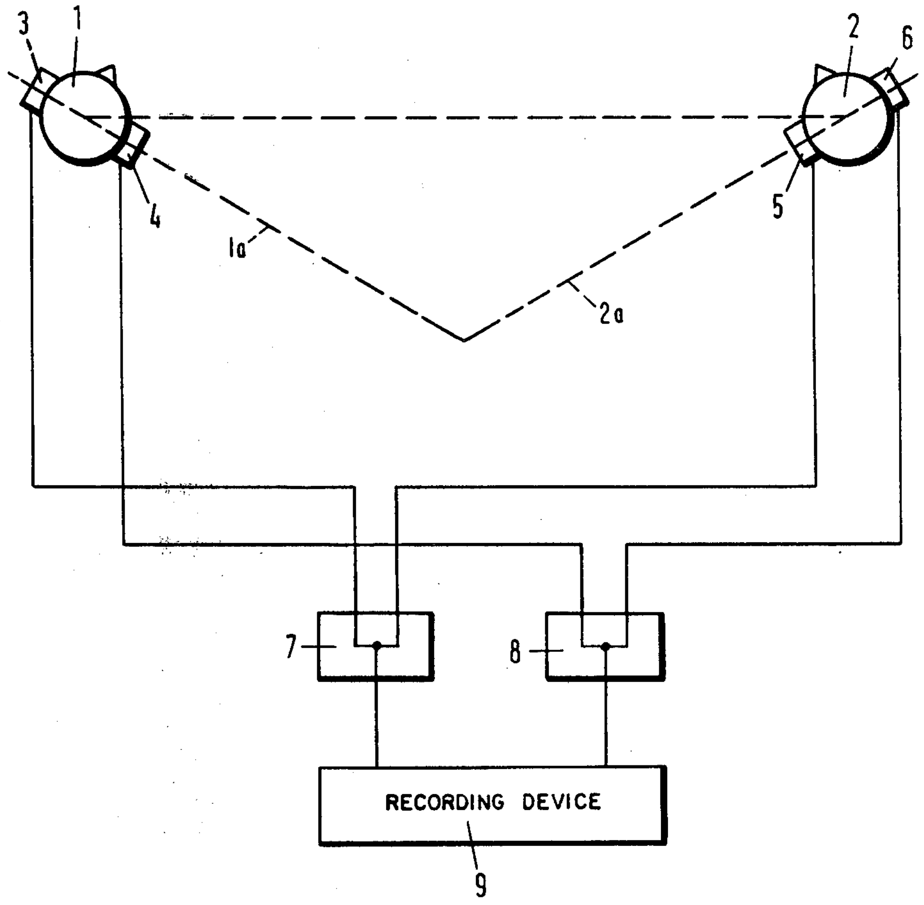

The invention relates to a method for receiving sound intended for stereophonic reproduction, in which sound is received by means of a plurality of spaced apart microphones and signals from the microphones are recorded on a recording medium in more than one recording or as different components of a single recording, or signals from the microphones are used for immediate re-transmission. The invention further relates to an apparatus for applying such a method.

In conventional stereo receiving techniques use is made of two spaced apart microphones or microphone systems. When reproducing the received sound, the sound collected by the different microphones (systems) is reproduced by different loudspeakers. The listener situated at a distance from the loudspeakers experiences the reproduction as "spatial". However, the reception of the sound by the listener is not fully identical to the reception which he would have had if he were actually present. On the one hand, this is a result of the fact that oppositely directed reverberation effects may occur during reproduction, on the other hand this is also a result of the fact that the listener hears the sound from each loudspeaker with both ears. Consequently, although the conventional stereo reproduction constitutes a considerable improvement with respect to monophonicreproduction, this reproduction is not yet perfect.

An improvement of the conventional stereo technique is achieved by a receiving technique known as the Sennheiser technique, in which use is made of a microphone pair of the so-called dummy head type. Such a dummy head has the shape of a human head with two microphones at the place of the ears. The signals received by these microphones are recorded or transmitted separately and the reproduction of these signals is performed via separate ear telephones or loudspeakers. The reproduction and perception by means of a head telephone of a sound received by means of a dummy head may be considered practically ideal. The sound collected, for example, in the left-hand microphone of the dummy head is reproduced in the left-hand ear telephone of the head telephone, while the sound collected in the right-hand microphone is reproduced in the right-hand ear telephone. As a result thereof, the listener hears the reproduced sound in the same manner as that in which it was received by the dummy head. However, when the signals received by the dummy head are reproduced via a pair of loudspeakers, the ideal sound picture is lost as one ear of the listener also hears the sound from the loudspeaker really intended only for the other ear. This adversely affects the stereo reproduction, while direction information is at any rate partly obscured.

It is an object of the invention to provide a method and apparatus for receiving sound intended for stereo reproduction, in which the above drawbacks of less ideal reproduction by means of loudspeakers are fully or substantially eliminated.

In accordance with the invention, this object is achieved as the reception is performed by means of at least two spaced apart microphone pairs of the dummy head type, the microphone pairs being coupled to each other so that signals collected by microphones located on similar sides of the dummy heads are mixed and recorded or are mixed and used for immediate re-transmission.

By mixing is understood in this connection that the signals from the microphones are directly coupled to each other without further processing. In fact, one could say that an addition is concerned. Proper attention should be paid, however, to the nature of the connection between each of the microphones and the junction point, as well as to the polarity. Preferably, the connections shall be identical to ensure that the signals are subjected to the same delay and/or attenuation, if any, in each connection.

The worker in the art will be able to establish the appropriate coupling required under these conditions.

By means of the method according to the invention, an improved stereo reproduction of the sound to be received can be achieved relative to the conventional receiving technique employing, for example, a single microphone pair of the dummy head type. When, for example, a moving sound source or sound wave passes in front of a single dummy head in a direction from left to right, at a given point of time during the reception a switch-over will occur from receiving predominantly via the left-hand microphone to receiving predominantly via the right-hand microphone. When reproducing the thus-received sound by means of a head telephone, a practically life-like "sound picture" is achieved. When reproducing the received sound through stereo loudspeakers, which are usually spaced apart a few meters, a so-called "gap" will occur in the information as the sound has to perform an instantaneous "jump" from one loudspeaker to the other. This drawback is eliminated by using the receiving technique described above, in which at least two microphone pairs of the dummy head type are used and the signals received are mixed in a highly particular manner. The manner in which the microphone pairs are positioned and directed, the distance which they are spaced apart and the number of pairs to be used in this technique depends on the nature of the sound to be received, the size of the space in which the reception is performed, etc.

When using the method according to the invention while employing two microphone pairs of the dummy head type it appears that the most ideal sound reproduction can be achieved if, during the reception, the microphone pairs are positioned to define a substantially isosceles triangle, the base of the triangle being constituted by the connecting line between the microphone pairs and the sides being constituted by the (extended) connecting line 1*a*, 2*a*, between the microphones of each of the pairs.

The stereo reproduction of thus-received sound is of particularly high quality. However, actual practice frequently requires a received or recorded sound, which is intended for stereo reproduction, to be suitable also for mono reproduction. This compatibility requirement is imposed, for example, upon received or recorded sound intended for radio broadcasting as the broadcasts will be received both by owners of mono reproducing equipment and by owners of stereo reproducing equipment. It may even be held that the greater part of the radio audience does not own stereo reproducing equipment. Consequently, if broadcasts would be transmitted having excellent stereo reproduction quality but poor mono reproduction quality, many complaints will be the result. It is for this reason, that the compatibility requirement is imposed.

In a suitable embodiment of the method according to the invention, in which the above compatibility requirement is satisfieid, two microphone pairs of the dummy head type are spaced apart a slight distance and are directed so that a major part of the spatial information area covered by one of the microphones of one of the microphone pairs is covered in a practically identical manner by the microphone on the non-similar side of the other microphone pair, the other microphone of the one microphone pair and the other microphone of the other microphone pair covering substantially non-overlapping information areas. In a preferred embodiment of this method the two microphone pairs are positioned practically on top of each other so that the connecting lines of the microphones of each pair cross at a suitable angle.

The idea underlying the method according to the invention, in which the compatibility requirement is satisfied, is that the microphone pairs are positioned so that one of the microphones of one pair and the microphone of the other pair the signals of which are not mixed with those of the first microphone, cover the same information area in a practically identical manner. The phrase "in a practically identical manner" is used to indicate that the microphones are closely spaced apart so that an information signal (the sound) reaches both microphones practically concurrently. In such an embodiment of the method according to the invention thus a minor sacrifice is made insofar as the stereo reproduction quality is concerned in order to achieve a very high compatibility. In actual practice, the mono reproduction of thus-received sound by means of standard reproducing equipment appears to be of good quality. The stereo reproduction of thus-received sound appears to be of a quality only slightly less than that of sound received by the method according to the invention in which the compatibility requirement is not satisfied.

An apparatus for receiving sound intended for stereophonic reproduction in accordance with the invention comprises a plurality of microphones and means to record signals received by the microphones on a recording medium in more than one recording or as different components of a single recording, or to process the received signals for immediate re-transmission, and is characterized by at least two microphone pairs of the dummy head type, the pairs being coupled so that signals from microphones located on similar sides of the respective microphone pairs are mixed and the resultant, mixed signal is applied for further processing to the output of the respective component of the apparatus.

Figure 2:
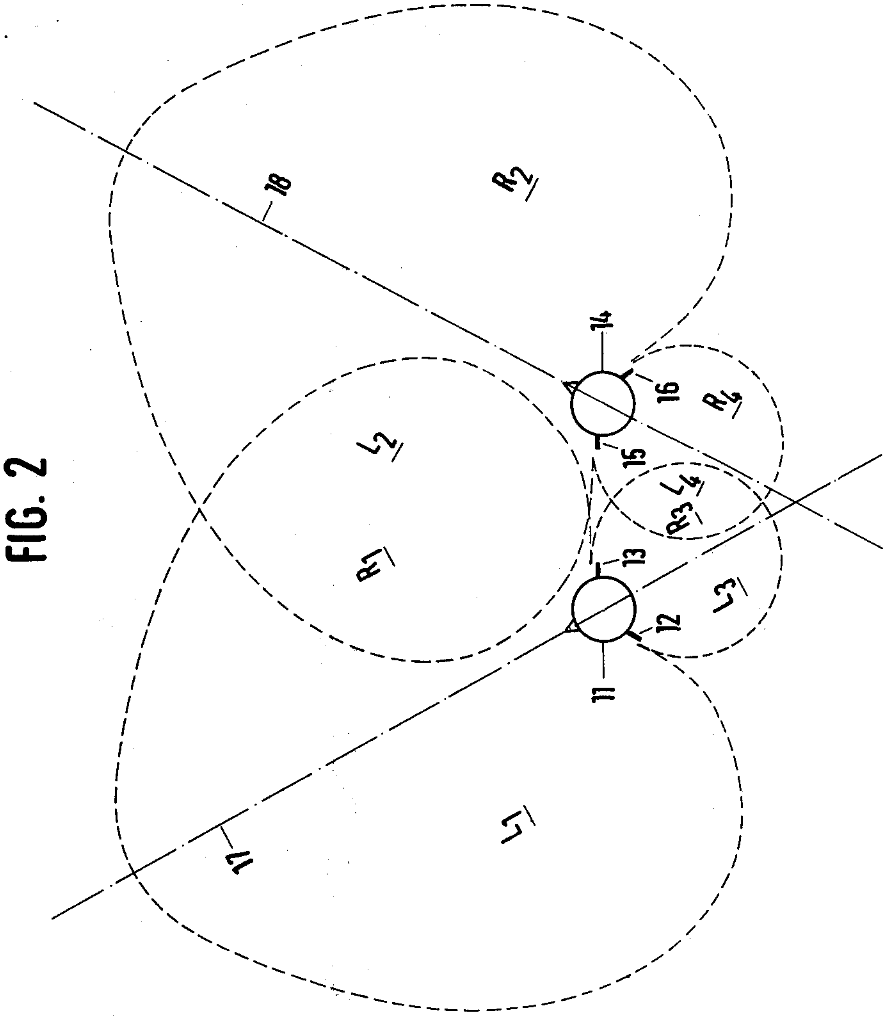

The invention will be elucidated hereinafter with reference to the accompanying drawings, in which:

FIG. 1 schematically shows a suitable arrangement of the components of the apparatus according to the invention when using the method according to the invention for stereo reception without satisfying the compatibility requirement, and FIG. 2 schematically shows an arrangement of two microphone pairs of the dummy head type to be used in accordance with the invention, in which the compatibility requirement is satisfied.

FIG. 1 shows two spaced apart dummy heads or microphone pairs 1 and 2. The distance between the microphone pairs is not critical and will be selected in dependence upon the reception condition. For example, in actual practice this distance will vary from 2.5 to 4 meters. In the preferred embodiment shown, the microphone pairs have a slightly converging arrangement, i.e. they are positioned to define a substantially isosceles triangle. The base of this triangle is constituted by the connection line between dummy heads 1 and 2. The equal sides of the triangle are constituted by the (extended) connecting line between microphones 3 and 4 located on either side of dummy head 1 and by the (extended) connecting line between microphones 5 and 6 located on either side of dummy head 2. In FIG. 1, the triangle is shown in dashed lines.

The dummy heads or microphone pairs used in the arrangement shown in FIG. 1 are of a type known to the worker in the art. In an arrangement tested in practice microphone pairs of the type Sennheiser MKE 2002 (triaxial-stereo-microphone) were used. A description of the characteristics of these microphones is given in the journal HiFi Stereophonie, No. 5, May 1975, pp. 531 et seq. The other microphone pairs of the dummy head type mentioned in this article also suit the purpose. The worker in the art will be able to choose the type suiting his purpose best.

The sound signals received by microphone 3 are passed to the mixing circuit 7. The signals received by microphone 5 are also passed to the mixing circuit 7. Consequently, a mixed signal appears at the output of circuit 7, which signal is passed to the processing section 9. Likewise, signals received by microphone 4 and 6 are passed to and mixed in mixing circuit 8. The signal appearing at the output of circuit 8 is also passed to processing section 9. The nature of processing section 9 depends on the intended use of the apparatus according to the invention. When the apparatus is to be used for recording the sound received on a recording medium, section 9 will comprise the customary components required for recording the signals from mixing circuits 7 and 8 respectively. These signals may be separately recorded or recorded as different components of a single recording track in a known per se manner.

In principle, circuits 7 and 8 merely comprise a terminal to which the conductors for applying the signals from microphones 3 and 5 and the conductors for the signals from microphones 4 and 6, respectively, are coupled. A conductor for the combined signal extends from the terminal to the further processing equipment. As stated earlier, the mixing essentially constitutes a mere additive coupling of the respective signals.

When the apparatus according to the invention is to be used for radio broadcasts, section 9 will include the customary means for transmitting the signals from circuits 7 and 8 as stereo signals. For example, such means are equipment commonly used in radio studios, such as filter panels, etc. The worker in the art will be readily able to choose the suitable equipment required for further processing. This equipment may include means for processing signals in the customary manner so as to obtain certain desired effects. However, all of these operations are optionally performed after the signals have been additively combined in the above manner.

When reproducing the sound received by means of the apparatus according to the invention, the signals from circuits 7 and 8, if necessary after being separated, are each reproduced via a separate loudspeaker or applied to the separate ear telephones of a head telephone. Practical use of the invention has shown that sound thus reproduced via loudspeakers gives the listener a considerably better "spatial" impression than sound reproduced by conventional techniques, while reproduction via a head telephone has practically the same quality as the corresponding reproduction of sound received by the standard dummy head stereo technique.

FIG. 2 shows a dummy head 11 including microphones 12 and 13. A second similar dummy head 14 including microphones 15 and 16 is positioned in close proximity to dummy head 11. Dummy heads 11 and 14 may be of the type described above with reference to FIG. 1. The dummy heads 11 and 14 have a slightly diverging arrangement. Their body axes 17 and 18 respectively intersect at an acute angle. When dummy heads 11 and 14 are positioned practically on top of each other, their body axes cross at such an angle. The information received by microphone 12 of dummy head 11 originates mainly from the area $L_1$ situated in front of the microphone and on the left of the body axis 17. Likewise, microphone 15 of dummy head 14 mainly receives information from area $L_2$ situated in front of the microphone and on the left of the body axis 18. Microphones 13 and 16 receive information originating mainly from regions $R_1$ and $R_2$ situated on the right of body axes 17 and 18 and in front of microphones 13 and 16, respectively. Self-evidently, all microphones receive an amount of information from the area behind the microphones. As the microphones are directed towards the area in front thereof, information from the rearward area will be received by the microphone to a lesser extent. The rearward areas covered are designated in FIG. 2 by $L_3$ (for microphone 12), $R_3$ (microphone 13), $L_4$ (microphone 15) and $R_4$ (microphone 16).

It will be clear that FIG. 2 only schematically shows the information areas. In actual fact the microphones cover a far wider range. Sound produced outside the areas indicated by L and R will reach each of the microphones but due to the arrangement of these microphones the contribution of such sound to the total amount of information received by a microphone will be of minor importance only.

In the embodiment of the method according to the invention in which the compatibility requirement is satisfied, the arrangement of the microphone pairs 11 and 14 is such that the information areas covered by microphones 13 and 15 substantially overlap, while the information reaches both microphones in substantially the same manner. This is shown in FIG. 2 as area $R_1$ substantially coincides with area $L_2$ and area $R_3$ practically corresponds with area $L_4$. Such an arrangement appears to result in receptions which are highly suited for reproduction by means of standard mono equipment, as the "center information" from the front and the rear of the arrangement is received to a great extent. In spite thereof, however, a high quality stereo reproduction is feasible as there remain an information area on the left and an information area on the right, the information of which is received separately (by means of microphone 12 and 16 respectively).

It will be clear that the method according to the invention may be performed with more than two microphone pairs. Particularly when the reception is performed in vast spaces, the use of only two dummy heads may appear insufficient. In this event a series of such microphone pairs may be employed. In a receiving system sastifying the compatibility requirement, such a series shall be composed of pairs of dummy heads which are positioned in close proximity or practically on top of each other.

I claim:

1. A method for receiving sound intended for stereophonic reproduction, in which sound is received by means of a plurality of spaced apart microphones and each signal from said microphones is recorded on a respective recording medium or on different parts of a single recording medium, or signals from said microphones are used for immediate re-transmission, characterized in that the reception is performed by means of at least two spaced apart microphone pairs of the dummy heads type, said microphone pairs being coupled to each other so that signals collected by microphones located on similar sides of said dummy heads are essentially added to each other and are substantially recorded or used for immediate re-transmission.

2. A method according to claim 1, characterized in that said microphone pairs are positioned to define a substantially isosceles triangle, the base of said triangle being constituted by the connecting line between said microphone pairs and the sides being constituted by the extended connecting line between the microphones of each of said pairs.

3. A method according to claim 1, characterized in that said at least two microphone pairs of the dummy head type are spaced apart a slight distance and are directed so that a major part of the spatial information area covered by one of the microphones of one of said microphone pairs is covered in a practically identical manner by the microphone on the non-similar side of the other microphone pair, the other microphone of said one microphone pair and the other microphone of said other microphone pair covering substantially non-overlapping information areas.

4. A method according to claim 3, characterized in that said two microphone pairs are positioned so that the connecting line of the microphones of each pair cross one another at a suitable angle.

5. An apparatus for receiving sound intended for stereophonic reproduction, comprising a plurality of microphones and means to record each signal received by said microphones on a respective recording medium or on different parts of a single recording medium, or to process the received signals for immediate re-transmission, characterized by at least two microphone pairs of the dummy head type, said pairs being coupled so that signals from microphones located on similar sides of the respective microphone pairs are essentially added to each other and the resultant combined signal is passed on for further processing.

* * * * *